United States Patent [19]

Makover et al.

[11] 3,907,639
[45] Sept. 23, 1975

[54] METHOD FOR PRODUCING 2-KETO-L-GULONIC ACID

[75] Inventors: Shraga Makover, Verona; David Louis Pruess, Passaic, both of N.J.

[73] Assignee: Hoffmann-La Roche Inc., Nutley, N.J.

[22] Filed: Aug. 31, 1972

[21] Appl. No.: 285,265

[52] U.S. Cl............ 195/36 R; 195/37 X; 195/47 X; 195/79
[51] Int. Cl.$^2$.......................................... C12D 1/06
[58] Field of Search ............ 195/36, 47, 49; 195/43

[56] References Cited
UNITED STATES PATENTS
3,234,105   2/1966   Motizuki et al.................... 195/47 X

OTHER PUBLICATIONS

Perlman et al., "The Fermentation of L-Sorbose" by Gluconobacter Melanogenus, III, Investigation of the Metabolic "Pathway from Sorbose to 2-Keto-L-Gulonic Acid", Biotechnology and Bioengineering Vol. XIV pp. 1035-1040 (1972).

"Redox Potential Changes in the 2-Keto-L-gulonic Acid Tengerdy, Fermentation – I Correlation between Redox Potential and Dissolved – Oxygen Concentration", J. of Biochem and Micro Tech. and Eng. Vol. III, No. 3, pp. 241-253.

Isono et al., Agr. Biol. Chem., Vol. 32, No. 4, pp. 424-431 (1968).

Kanzanki et al., Agr. Biol. Chem., Vol. 34, No. 3, pp. 432-436 (1970).

*Primary Examiner*—A. Louis Monacell
*Assistant Examiner*—Thomas G. Wiseman
*Attorney, Agent, or Firm*—Samuel L. Welt; Jon S. Saxe; William H. Epstein

[57] ABSTRACT

The present invention relates to a microbiological method for producing 2-keto-L-gulonic acid, an important intermediate in the production of vitamin C, from L-sorbosone.

25 Claims, No Drawings

METHOD FOR PRODUCING 2-KETO-L-GULONIC ACID

BACKGROUND OF THE INVENTION

The compound 2-keto-L-gulonic acid, which has the formula:

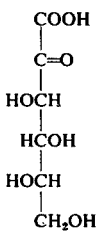

is an important and valuable intermediate in the production of L-ascorbic acid (vitamin C). In the past, 2-keto-L-gulonic acid has been produced microbiologically by the fermentation of L-sorbose. However, this process has suffered from the disadvantage that yields have been of the order 5%. These low yields preclude the commercialization of such a procedure. Therefore, it has long been desired to provide a direct method for producing 2-keto-L-gulonic acid in high yields.

SUMMARY OF THE INVENTION

In accordance with this invention, it has been found that 2-keto-L-gulonic acid can be produced in one step by the microbiological oxidation of L-sorbosone, which has the formula:

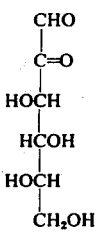

By the process of this invention, 2-keto-L-gulonic acid has been produced in yields as high as 80%.

Among the microorganisms suitable for the process of the invention are included members of the following genera:

Acetobacter;
Pseudomonas;
Escherichia;
Serratia;
Bacillus;
Staphylococcus;
Aerobacter;
Alcaligenes;
Penicillium;
Candida; and
Gluconobacter By this procedure, a direct process is provided for microbiologically producing 2-keto-L-gulonic acid in high yields without the necessity of utilizing chemical conversions which require the steps of protecting the free hydroxyl groups and subsequently removing these protecting groups.

DETAILED DESCRIPTION

The novel process of this invention involves the one-step microbiological conversion of L-sorbosone to 2-keto-L-gulonic acid.

any microorganism of the aforementioned genera capable of converting L-sorbose to 2-keto-L-gulonic acid can be utilized in accordance with this invention. Among the preferred strains are included *Gluconobacter melanogenum* IFO 3293; *Bacillus subtilis* (NRRL 558); *Candida albicans* (NRRL 477); *Penicillium digitatum* (ATCC 10030); *Pseudomonas putida* (ATCC 21812); *Aerobacter aerogenes; Staphylococcus aureus* (ATCC 6538P); *Pseudomonoa aeruginosa; Escherichia coli;* Alcaligenes species (ATCC 10153) and *Serratia marcescens*.

A number of the strains of these species are publicly available in culture collections, both in the United States and abroad.

ATCC = American Type Culture Collection, Washington, D.C.;

NRRL = National Regional Research Laboratory, Peoria, Ill.;

IFO = Institute for Fermentation, Osaka, Japan.

The above-mentioned microorganisms can be induced to from mutants having superior ability relative to the parent wild strains of producing the enzyme system capable of transforming L-sorbosone to 2-keto-L-gulonic acid. Such mutation can be caused by treating a wild strain with a mutagen such as ultra-violet irradiation, X-ray irradiation or contact with nitrous acid, or by isolating a clone occurring by spontaneous mutation. These means for inducing the desired mutation on a wild type strain may be effected in any of the ways per se well known for this purpose by one skilled in the art. Many of these methods have been described in various publications, for example, "Methods in Medical Research" Vol. 3, edited by R. W. Gerard, published by the Year Book Publishers, Inc., Chicago, U.S.A., in 1950, and "Nature" Vol. 183, p. 1829 (1959) by F. Kaudewitz.

The production of 2-keto-L-gulonic acid is effected by the cultivation of one of the 2-keto-L-gulonic acid producing organisms in an aerated deep tank, i.e., under submerged fermentation. In order to obtain high yields, certain conditions should be maintained. The fermentation should be conducted at pH values of from about 5 to about 9 with pH values of from about 6.5 to about 7.5 being preferred. It is particularly preferred to carry out the process of this invention at a pH of about 7.2. Although the temperature is not critical, best results are usually obtained utilizing temperatures of from 20°C to 45°C, with temperatures of from about 25° to 35°C being particularly preferred. In general, about 1 to 10 days are required to obtain the best results and from about four to seven days is found most suitable.

The method of the present invention can be carried out by culturing the microorganism in a medium containing L-sorbosone and other appropriate nutrients. On the other hand, the process of this invention can be carried out by culturing the microorganism and then after culturing, the whole cells or the cell free extract collected from the culture are brought into contact with L-sorbosone.

In the case where the microorganism is cultured in a medium containing L-sorbosone and appropriate nutrients, the microorganism may be cultured in an aqueous medium in an aerated fermentor. The cultivation should be conducted at pH values of from about 5 to about 9, with pH's of from about 6.5 to 7.5 being preferred. Especially preferred is utilizing a pH of about 7.2. A preferred temperature range for carrying out this cultivation is from about 20°C to about 45°C with temperatures of from about 25° to 30°C being especially preferred. While the time for cultivation varies, with the kind of microorganisms and nutrient medium to be used, about 1 to 10 day cultivation usually brings about most preferable results. Concentration of sorbosone in the media varies with the kind of microorganisms, is generally desirable to be about 1 to 200 grams/liter, most preferably from about 5 to about 50 grams/liter.

It is usually required that the culture medium contains such nutrients for the microorganism as assimiable carbon sources, digestible nitrogen sources and preferably inorganic substances, vitamins, trace elements, other growth promoting factors, etc. L-sorbosone per se can serve as the carbon source, but it is preferred to utilize other substances as carbon sources. Among the substances which can be utilized as carbon sources are included starch, cane sugar, lactose, dextrin, glycerol, maltose, etc. They can be employed at a concentration of from about 1 g./l. to about 10 g./l. As the nitrogen sources, there may be used various organic or inorganic substances such as soybean meal, meat extracts, peptone, casein, yeast extracts, corn steep liquor, urea, nitrates, ammonium salts, etc. As the inorganic nutrients, for example, potassium phosphates, magnesium sulfate, ferrous and ferric chlorides, calcium carbonate, etc., are usually employed. As the constituents of the medium vary also with the kind of microorganisms to be employed, it is preferable to choose a proper medium case by case.

In the case where after cultivation, the whole culture, i.e., the cells collected from the culture are brought into contact with the L-sorbosone, cultivation of the microorganisms is carried out under similar conditions described above. Substances mentioned above are also used for nutrients for this cultivation. The whole grown culture is then utilized to convert L-sorbosone to 2-keto-L-gulonic acid. This conversion can be simply carried out in an aqueous medium under submerged conditions utilizing a pH of from about 5 to 9. In this conversion, no additional nutrients need be present.

Generally, from about 1 to 3 days culture is preferable for obtaining the most effective cells for the conversion of L-sorbosone to 2-keto-L-gulonic acid. In one case, L-sorbosone or its aqueous solution is added to the cultured medium to make its final concentration from about 1 g./l. to about 200 g./l. The mixed solution may be incubated for about 1–10 days under the same conditions as discussed above. In another case, the cells may be collected by centrifugation from the cultured broth and resuspended in an aqueous medium at a pH of from about 5 to 9. Then L-sorbosone is added in the same way as mentioned above. The succeeding incubation may be effected under similar conditions as those described above.

On the other hand, when cell free extracts from the whole grown culture are utilized, these cell free extracts can be utilized to convert L-sorbosone to 2-keto-L-gulonic acid by treating L-sorbosone with the cell free extracts in an aqueous medium under submerged conditions at a pH of from 5 to 9. In this case, no nutrients need be present.

Where the whole cells or the cell free extract is utilized to convert L-sorbosone to 2-keto-L-gulonic acid, this conversion is generally carried out with no additional nutrients being present. However, if desired, any of the conventional nutrients such as those mentioned hereinbefore may be added to the aqueous fermentation medium containing either the whole grown cells or the cell free extract. Furthermore, in carrying out fermentation of L-sorbosone with whole grown cells or with cell free extract, temperatures are not critical. However, it is generally preferred to utilize incubating temperatures of from 20°C. to 40°C. Generally, this fermentation is carried out at a pH of from 5 to 9.

In the method of the present invention, the resulting 2-keto-L-gulonic acid in the reaction mixture need not be isolated, but the reaction mixture can directly be esterified, followed by enolization and lactonization and can be converted to L-ascorbic acid. In the case of isolating the 2-keto-L-gulonic acid from the reaction mixture, isolation may be effected by the formation of a salt or by using differences in properties between the product and impurities such as solubility, adsorbability, distribution coefficient between the two solvents. Use of an adsorbent such as ion exchange resin is one of the most convenient processes for the isolation of the product. Since the 2-keto-L-gulonic acid thus obtained is, in general, not pure, it may be purified by conventional methods such as recrystallization, and chromatography.

As stated above, 2-keto-L-gulonic acid can be converted to L-ascorbic acid by application of any of the known methods, if desired. L-ascorbic acid is generally synthesized by esterifying 2-keto-L-gulonic acid in the presence of a mineral acid such as sulfuric acid, hydrochloric acid or strongly acidic cation exchange resin, as a catalyst, followed by enolizing the ester and subsequent lactonizing the enol compound. The resulting 2-keto-L-gulonic acid, in the reaction mixture, need not be separated, but the reaction mixture can directly be esterified, enolized and lactonized by procedures well known in the art.

The following Examples are illustrative of the invention. All temperatures are in degrees centigrade. The *Pseudomonas putida* utilized in the following Examples was *Pseudomonas putida* ATCC 21812.

EXAMPLE 1

A *Pseudomonas putida* culture was grown overnight on a rotary shaker at 28°C in a 125 ml. Erlenmeyer flask containing 20 ml. of the following medium:

|  | g./l. |
| --- | --- |
| Glycerol | 2.5 |
| Sodium citrate | 5.0 |
| $K_2HPO_4$ | 10.0 |
| $KH_2PO_4$ | 5.0 |
| $Na_2SO_4$ | 2.5 |
| $(NH_4)_2SO_4$ | 0.28 |
| $MgCl_2 \cdot 6H_2O$ | 0.20 |
| $CaCl_2 \cdot 2H_2O$ | 0.016 |
| $FeCl_3 \cdot 6H_2O$ | 0.001 |
| $ZnCl_2$ | 0.0005 |
| $CuCl_2 \cdot 2H_2O$ | 0.0005 |
| $MnCl_2 \cdot 4H_2O$ | 0.0005 | one-half ml. of the resulting suspension culture was inoculated into a 50 ml. Erlenmeyer flask containing 9.5 ml. of fresh medium supplemented with 5 g./l. L-sorbosone (L-xylo-hexosulose). The flask was incubated on a rotary shaker at 28 degrees centigrade. The production of 2-keto-L-gulonic acid was monitored by paper electrophoresis at pH 2.6 and by paper chromatography in a solvent system consisting of pyridine: ethylacetate : acetic acid : water (5:5:1:3 parts by volume). The paper strips were treated with aniline phthalate to visualize the 2-keto-L-gulonic acid produced.

EXAMPLE 2

The procedure of Example 1 was carried out except that the sorbose concentration was 10 g./l. By this procedure 2-keto-L-gulonic acid was produced in a 20% yield.

EXAMPLE 3

A culture of *Pseudomonas putida* was maintained on a medium consisting of (in g./l.) L-sorbose 20, glycerol 5, yeast extract 1, peptone 10, $CaCO_3$ 5, and agar-agar 20. This culture was used to inoculate a medium identical to that described in Example 1 except that the glycerol concentration was 5 g./l. and 4 g. L-sorbose is added per liter of medium. After 20 hours incubation in an Erlenmeyer flask at 28°C on a rotary shaker, 2 liters of the resulting inoculum was used to seed 200 liter of fresh medium contained in a 400 liter stainless steel fermentation tank. The tank was incubated at 28°C and an aeration rate of 4 CFM and an agitation rate of 280 rpm was maintained for 22 hours; at this time the optical density of the culture measured at 490 nm had reached 1.0. About 270 g. (wet weight) of cells were separated from the supernatant by centrifugation and those cells stored at −80°C for future use.

Approximately 50 g. of the frozen cells were thawed and suspended in 20 ml. 0.05 M aqueous potassium phosphate buffer at pH 7.2. The cells were crushed in a French press at 13,000–14,000 p.s.i. Cell debris was removed from the French press exudate by centrifuging twice at 11,000 × g. for 15 minutes at 4 degrees centigrade. The supernatant was dialyzed once against 0.02 M aqueous sodium phosphate buffer at pH 7.0 containing 0.001 M ethylenediamine tetraacetic acid (EDTA) and then dialyzed against the buffer without EDTA. The resulting preparation, designated dialyzed fraction 1, contained 30 mg. protein per ml. and was used as follows:

A reaction mixture was prepared containing in a total volume of 1.0 ml. the following:

| | |
|---|---|
| 0.2 M sodium phosphate, pH 7.0 | 0.2 ml. |
| Dialyzed fraction 1 | 0.5 ml. |
| L-sorbosone | 5.0 mg./.3 ml. |

The reaction mixture was incubated aerobically for 6 hours at 30 degrees centigrade. Analyses for 2-keto-L-gulonic acid was carried out by the same procedures as described in Example 1. Forty percent of the sorbosone was converted to 2-keto-L-gulonic acid.

EXAMPLE 4

A culture of *Bacillus subtilis* (NRRL 558) was grown overnight in a 250 ml. Erlenmeyer flask in 50 ml. of the following medium:

| Composition of media | Grams/Liter |
|---|---|
| Difco Bacto peptone[1] | 6 |
| Glucose (cerelose) | 1 |
| N–Z Amine A[2] | 4 |
| Yeast autolysate | 3 |
| Beef extract | 1.5 |

[1] A mixture of amino acids and peptides.
[2] A mixture of amino acids and peptides formed by the enzymatic hydrolysis of casein.

The flask was incubated at 28°C on a rotary shaker. Ten ml. of the resulting culture was transferred to a tube containing 50 mg. L-sorbosone (L-xylohexosulose) in 0.5 ml. sterile water. After five days incubation at 28°C on a rotary shaker, the culture broth was analyzed for 2-keto-L-gulonic acid by paper electrophoresis at pH 2.6. The electrophorograms were treated with silver nitrate and the 2-keto-L-gulonic acid levels estimated at 0.2 mg./ml. by comparisons with 2-keto-L-gulonic acid standards.

EXAMPLE 5

The procedure of Example 4 was utilized except that the microorganism was *Candida albicans* (NRRL 477) and the medium was:

| Cornsteep Liquor Medium | Grams/Liter |
|---|---|
| Cornsteep liquor | 25 |
| $FeSO_4 . 7H_2O$ | 0.1 |
| $MgSO_4 . 7H_2O$ | 0.1 |
| $KH_2PO_4$ | 0.3 |
| $K_2HPO_4$ | 0.7 |
| NaCl | 0.5 |
| Glycerol | 0.5 |
| Adjusted to pH 7.0 with 2N aqueous KOH | |

EXAMPLE 6

The procedure of Example 4 was utilized except that the microorganism was *Penicillium digitatum*.

EXAMPLE 7

Conversion of L-sorbosone (different concentrations) to 2-keto-L-gulonic acid (2-KGA) by intact cells of Pseudomonas putida and Bodenheimer's bacillus (Alcaligenes species)

*Pseudomonas putida* culture and Bodenheimer's bacillus culture designated PCI-3 (Alcaligenes species ATCC 10153) were grown overnight from frozen inoculum in 250 Erlenmeyer flasks on a rotary shaker at 28°C. containing 50 ml. of a medium having the following composition:

| | Grams/Liter |
|---|---|
| Difco Bacto peptone | 6 |
| Glucose (Cerelose) | 1 |
| N–Z Amine A | 4 |
| Yeast Autolysate | 3 |
| Beef extract | 1.5 |

One ml. of the culture suspension was transferred to 49 ml. fresh medium having the composition given in Example 1, and incubation continued for 24 hours. The 24 hour fermentation (9.5 ml.) was used to inoculate the 50 ml. flasks containing 0.5 ml. of an L-sorbosone solution at different concentrations. After 2 and 9 days of incubation, the culture broth was analyzed for 2-keto-L-gulonic acid by paper electrophoresis at pH 2.6. The electrophorograms were treated with either silver nitrate or aniline to visualize the 2-keto-L-gulonic acid (2-KGA). The results are summarized in the following Table.

| Microbiological Conversion of L-Sorbosone to 2-KGA | | | | |
|---|---|---|---|---|
| Flask | L-Sorbosone (0.5 ml.) g./l. | Inoculum (9.5 ml.) | 2-KGA yield (%) 2 days | 9 days |
| 1 | 5 | P. putida | 80 | 80 |
| 2 | 5 | Alcaligenes sp. | 40 | 60 |
| 3 | 10 | P. putida | 60 | 60 |
| 4 | 10 | Alcaligenes sp. | 60 | 60 |
| 5 | 25 | P. putida | 28 | 32 |
| 6 | 25 | Alcaligenes sp. | 28 | 32 |
| 7 | 50 | P. putida | 14 | 16 |
| 8 | 50 | Alcaligenes sp. | 14 | 16 |

EXAMPLE 8

Conversion of sorbosone to 2-keto-L-gulonic acid by a washed cell suspension of Pseudomonas putida A *Pseudomonas putida* culture was grown overnight from frozen inoculum (maintained at −20°C.) on a rotary shaker at 28°C. in a 500 ml. Erlenmeyer flask containing 100 ml. of medium given in Example 7. Two ml. of the resulting suspension culture was transferred to a 500 ml. flask containing 98 ml. of medium and grown on a rotary shaker at 28°C. for 24 hours. The 24 hour culture was centrifuged, washed once with 0.01 M aqueous potassium phosphate buffer pH 7.0 and the washed cells suspended in 100 ml. of the same buffer. The cell suspension was transferred to a small fermentor and placed on a magnetic stirrer at 28°C. Three grams of L-sorbosone in 24 ml. of water were added at a constant rate of 62.5 mg./hour over a period of 48 hours. Throughout the incubation (68 hours) the reaction mixture was agitated, aerated and the pH maintained constant at 7.2 by addition of 1 N aqueous KOH. After 68 hours the reaction mixture was centrifuged and the supernatant filtered through a 0.2 micron membrane filter to obtain 110 ml. of a broth filtrate. The amount of 2-keto-L-gulonic acid in the filtrate was determined by paper electrophoresis at pH 2.6 and subsequent treatment with aniline. The calculated yield was 1.1 g. (as the free acid) which corresponds to 34% conversion (on molar basis) of L-sorbosone to 2-keto-L-gulonic acid.

A portion of the broth filtrate (90 ml.) was adjusted to pH 9.5 with 25% by weight aqueous trimethyl amine solution and applied to a column containing 400 ml. (68 cm ht) Bio-Rad AG 1X4[1] (100–200 mesh, in the bicarbonate form) anion exchange resin. The solution was washed on with 30 ml. distilled water and the column was eluted with 0.4 M aqueous trimethylammonium bicarbonate buffer, pH 8.5, at a flow rate of 7 ml./min. Fractions containing 2-keto-L-gulonic acid, occurring at an elution volume from 725 to 1045 ml. were combined and concentrated to a residue to 1.24 g. The residue was dissolved in water and the solution was passed through 25 ml. Bio-Rad AG 50WX4[2] (100–200 mesh, in the hydrogen ion form) cation exchange resin. The effluent and water wash of the resin were combined and concentrated to a small volume, the pH was adjusted to 9.0 with 2 N NaOH, and the mono-hydrate of the sodium-salt of 2-keto-L-gulonic acid was crystallized from 10 ml. 50% by volume ethanol and 50% by volume water. Yield: 1st crop 797 mg.; 2nd crop 230 mg.; another 135 mg. partially crystalline solids remained in the mother liquor.

[1] Polystyrene resin containing quaternary ammonium group.
[2] Polystyrene sulfonic acid ion exchange resin.

We claim:

1. A process for the preparation of 2-keto-L-gulonic acid from L-sorbosone comprising enzymatically transforming sorbosone to 2-keto-L-gulonic acid by the action of an enzyme system of a microorganism capable of converting L-sorbosone to 2-keto-L-gulonic acid selected from the group consisting of the following genera:
   Acetobacter;
   Pseudomonas;
   Escherichia;
   Serratia;
   Bacillus;
   Staphylococcus;
   Aerobacter;
   Alcaligenes;
   Gluconobacter;
   Candida; and
   Penicillium.

2. The process of claim 1 wherein said microorganism is *Pseudomonas putida* ATCC 21812.

3. The process of claim 1 wherein said microorganism is *Bacillus subtilis* NRRL 558.

4. The process of claim 1 wherein said enzymatic transformation is carried out at a pH of from about 5 to 9.

5. The process of claim 4 wherein said enzymatic transformation is carried out at a temperature of from 20°C. to 45°C.

6. The process of claim 5 wherein said enzymatic transformation is carried out under submerged aerobic conditions.

7. A method for producing 2-keto-L-gulonic acid from L-sorbosone which comprises subjecting L-sorbosone to the action of an enzyme system produced by culturing a microorganism capable of transforming L-sorbosone to 2-keto-L-gulonic acid selected from the group consisting of:
   Acetobacter;
   Pseudomonas;
   Escherichia;
   Serratia;
   Bacillus;
   Staphylococcus;
   Aerobacter;
   Alcaligenes;
   Gluconobacter;
   Candida; and
   Penicillium;
by culturing said microorganism in a culture medium containing L-sorbosone, whereby the latter is converted into 2-keto-L-gulonic acid which accumulates in said medium.

8. The process of claim 7 wherein said microorganism is *Pseudomonas putida* ATCC 21812.

9. The process of claim 7 wherein said microorganism is *Bacillus subtilis* NRRL 558.

10. The process of claim 7 wherein said culture medium is maintained at a pH of from 5 to 9.

11. The process of claim 10 wherein culture medium is maintained at a temperature of from 20°C. to 45°C.

12. The process of claim 11 wherein said microorganism is cultured under submerged aerobic conditions.

13. A process for the preparation of 2-keto-L-gulonic acid which comprises pre-culturing a microorganism capable of producing 2-keto-L-gulonic acid from L-sorbosone selected from the group consisting of the following genera:
- Acetobacter;
- Pseudomonas;
- Escherichia;
- Serratia;
- Bacillus;
- Staphylococcus;
- Aerobacter;
- Alcaligenes;
- Gluconobacter;
- Candida; and
- Penicillium;

in an aqueous inoculum medium to obtain inoculum, inoculating the thus produced inoculum into a L-sorbosone containing medium, incubating the inoculated medium to convert the L-sorbosone in the medium to 2-keto-L-gulonic acid.

14. The process of claim 13 wherein said microorganism is *Pseudomonas putida* ATCC 21812.

15. The process of claim 13 wherein said microorganism is *Bacillus subtilis* NRRL 558.

16. The process of claim 13 wherein said inoculum is whole cells produced by preculturing said microorganism.

17. The process of claim 16 wherein said pre-culturing is carried out at a pH of from about 5-9.

18. The process of claim 17 wherein said pre-culturing is carried out at a temperature of 20°C. to 45°C.

19. The process of claim 18 wherein said pre-culturing is carried out under submerged aerobic conditions.

20. The process of claim 7 wherein sid inoculum is the cell free extract from the cells produced by pre-culturing said microorganism.

21. The process of claim 20 wherein said microorganism is *Pseudomonas putida* ATCC 21812.

22. The process of claim 20 wherein said microorganism is *Bacillus subtilis* NRRL 558.

23. The process of claim 20 wherein said pre-culturing is carried out at a pH of from about 5-9.

24. The process of claim 23 wherein said pre-culturing is carried out at a temperature of 20°C. to 45°C.

25. The process of claim 24 wherein said pre-culturing is carried out under submerged aerobic conditions.

* * * * *